(12) United States Patent
Worsdell et al.

(10) Patent No.: US 6,994,459 B2
(45) Date of Patent: Feb. 7, 2006

(54) IN LIGHTING (75) Inventors: Anthony William Worsdell, Somerset (GB); Paul Denton Curry, Somerset (GB)

(73) Assignee: Thales Optronics ( Taunton) Ltd., (GB)

(*) Notice: Subject to any disclaimer, the term of this patent is extended or adjusted under 35 U.S.C. 154(b) by 0 days.

(21) Appl. No.: 10/047,521

(22) Filed: Nov. 13, 2001

(65) Prior Publication Data

US 2002/0149944 A1    Oct. 17, 2002

Related U.S. Application Data

(63) Continuation of application No. PCT/GB00/01924, filed on May 19, 2000.

(30) Foreign Application Priority Data

May 21, 1999    (GB)    ................................... 9911943

(51) Int. Cl.
*B64D 47/02*    (2006.01)
*B64F 1/20*    (2006.01)
*F21V 1/20*    (2006.01)
*F21V 21/00*    (2006.01)

(52) U.S. Cl. ...................... 362/470; 362/520; 362/227; 362/326; 362/800; 362/545

(58) Field of Classification Search ................ 362/470, 362/509, 520, 227, 326, 800, 545; 340/956, 340/980, 982, 321, 815.45, 815.75, 815.76; 359/528, 530, 533
See application file for complete search history.

(56) References Cited

U.S. PATENT DOCUMENTS

| | | | | |
|---|---|---|---|---|
| 1,320,308 A | * | 10/1919 | Balch | .................... 340/815.68 |
| 1,430,580 A | * | 10/1922 | Old | ............................. 362/333 |
| 4,521,835 A | * | 6/1985 | Meggs et al. | ................ 362/183 |
| 4,698,730 A | | 10/1987 | Sakai et al. | |
| 4,733,335 A | * | 3/1988 | Serizawa et al. | ............. 362/80 |
| 5,174,649 A | | 12/1992 | Alston | |
| 5,388,035 A | * | 2/1995 | Bodem, Jr. | ................... 362/61 |
| 5,528,474 A | * | 6/1996 | Roney et al. | ................ 362/249 |
| 5,984,494 A | * | 11/1999 | Chapman et al. | ........... 362/470 |

(Continued)

FOREIGN PATENT DOCUMENTS

DE    4128995 A1   *   3/1993

(Continued)

*Primary Examiner*—Thomas M. Sember
*Assistant Examiner*—Sharon Payne
(74) *Attorney, Agent, or Firm*—Lerner, David, Littenberg, Krumholz & Mentlik, LLP (57) ABSTRACT

An optical unit for an aircraft warning light comprising an array of LEDs, the unit comprising a transparent plastics molded body having first and second opposing faces and being provided with optical means on its first and optionally also its second face to propagate fractions of light emitted from the LEDs in selected directions in accordance with a predetermined angular distribution. The optical means may, for example, take the form of discrete convex lenses, cylindrical aspherical lenses, prisms or total internal reflection structures and combinations thereof selected according to the emission requirements for the warning light. The optical unit will therefore differ depending on whether it is for use on a navigation light or an anti-collision light and will generally be spaced at a predetermined, fixed distance from the LED array.

2 Claims, 6 Drawing Sheets

SECTION X-X

U.S. PATENT DOCUMENTS

| | | | |
|---|---|---|---|
| 6,203,180 B1 * | 3/2001 | Fleischmann | 362/471 |
| 6,273,591 B1 * | 8/2001 | Albou | 362/333 |
| 6,296,376 B1 * | 10/2001 | Kondo et al. | 362/310 |
| 6,386,743 B1 * | 5/2002 | Futami et al. | 362/516 |
| 6,461,029 B2 * | 10/2002 | Gronemeier et al. | 362/545 |
| 6,550,949 B1 * | 4/2003 | Bauer et al. | 362/545 |

FOREIGN PATENT DOCUMENTS

| | | |
|---|---|---|
| EP | 0125362 A1 | 11/1984 |
| FR | 2707222 A1 | 1/1995 |
| GB | 2282877 | 4/1995 |
| GB | 2295274 A * | 5/1996 |

* cited by examiner

SECTION X-X

IN LIGHTING

CROSS-REFERENCE TO RELATED APPLICATIONS

This application is a continuation of International Application No. PCT/GB00/01924, filed May 19, 2000 and published in English under International Publication No. WO 00/71417 on Nov. 30, 2000, and claims the priority of British patent application 9911943.0 filed May 21, 1999. The entire disclosure of International Application No. PCT/GB00/01924 and British patent application 9911943.0 are incorporated herein by reference.

BACKGROUND OF THE INVENTION

This invention relates to improvements in lighting, particularly to warning lights for external use on aircraft.

External aircraft lights, broadly speaking, fall into two main categories. The first is for the purpose of illuminating the space around the aircraft to improve visibility for the pilot, of which landing lights are an example. The second is to act as warning lights for the purpose of providing a visible warning of the aircraft's presence to observers both on the ground and in other aircraft.

Essentially, there are two types of external aircraft warning lights: anti-collision lights and navigation lights.

Anti-collision lights are intended to attract the attention of observers, especially in low light conditions and, accordingly, these lights are designed to emit very bright light all around the aircraft and are usually pulsed so that they flash at between about 40 to 100 times a minute. In addition to the necessity of emitting light all around the aircraft, regulations imposed by the relevant national governing aviation bodies—such as the Civil Aviation Authority (CAA) in the UK and the Federal Aviation Authority (FAA) in the USA—stipulate that there should be a low divergence in the vertical plane. Accordingly, anti-collision lights ideally emit light in a substantially horizontal disk pattern.

Once an observer is made aware of the presence of an aircraft by its anti-collision lights, the navigation lights provide an indication of the orientation of the aircraft. Typically, an aircraft carries at least three navigation lights: a green light on the starboard side, a red light on the port side and a white light on the rear of the aircraft. For example, these may be located respectively on the end of the wings and on the tail of an aeroplane. They are less bright than anti-collision lights and are generally illuminated continuously in use.

In contrast with anti-collision lights which are required to be visible around 360° in a horizontal plane, both the horizontal and vertical distribution of emitted light from a navigation light are important. This is because each navigation light is required to emit light in a horizontal plane around the aircraft and at a minimum intensity which varies according to angular direction. For example, the red and green lights are not only required to emit bright light directly forward from the aircraft, but are also required to emit light to the port side and the starboard side respectively, albeit of a lower minimum intensity than in the forward direction.

Figure 1A:
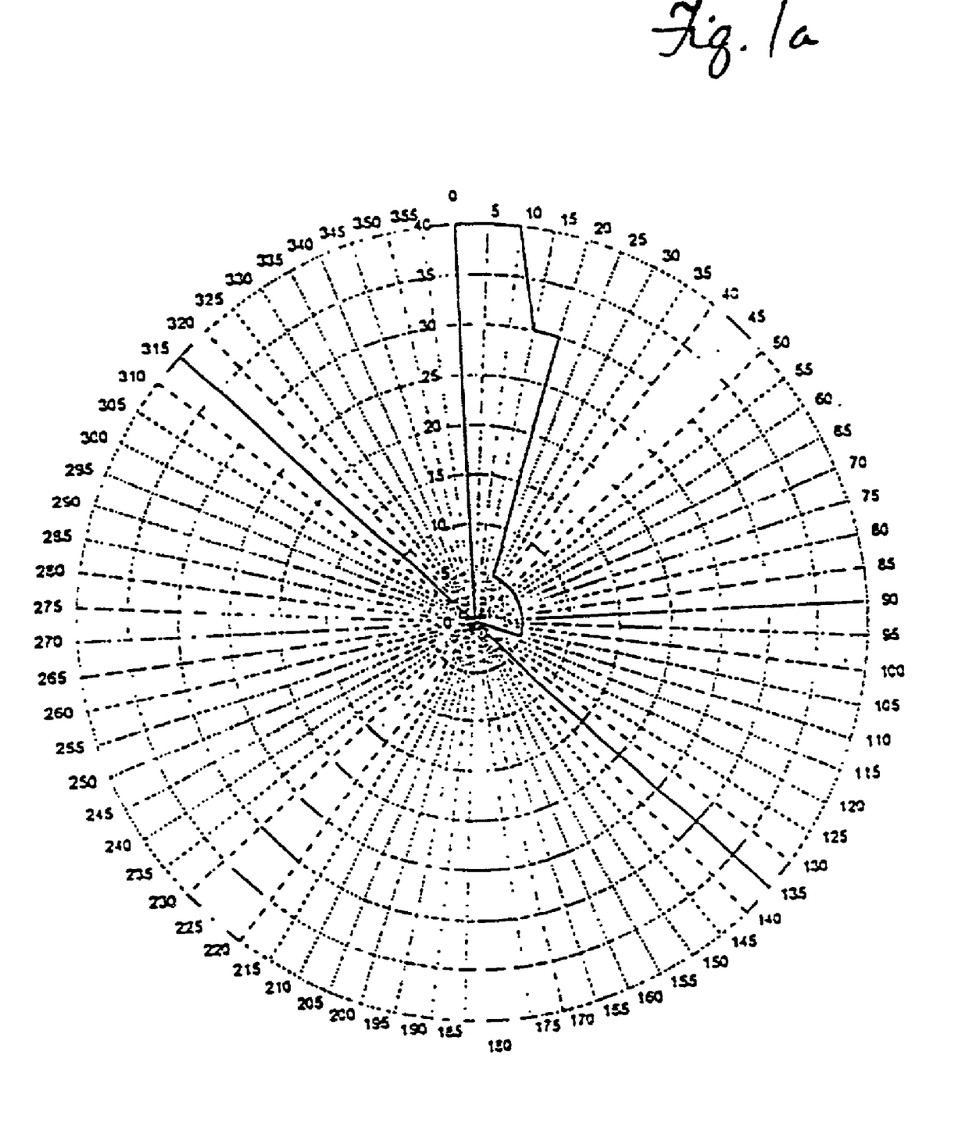
FIG. 1a is a polar plot of the minimum required azimuthal angular distribution of light for a starboard navigation light stipulated by the FAA.
Figure 1B:
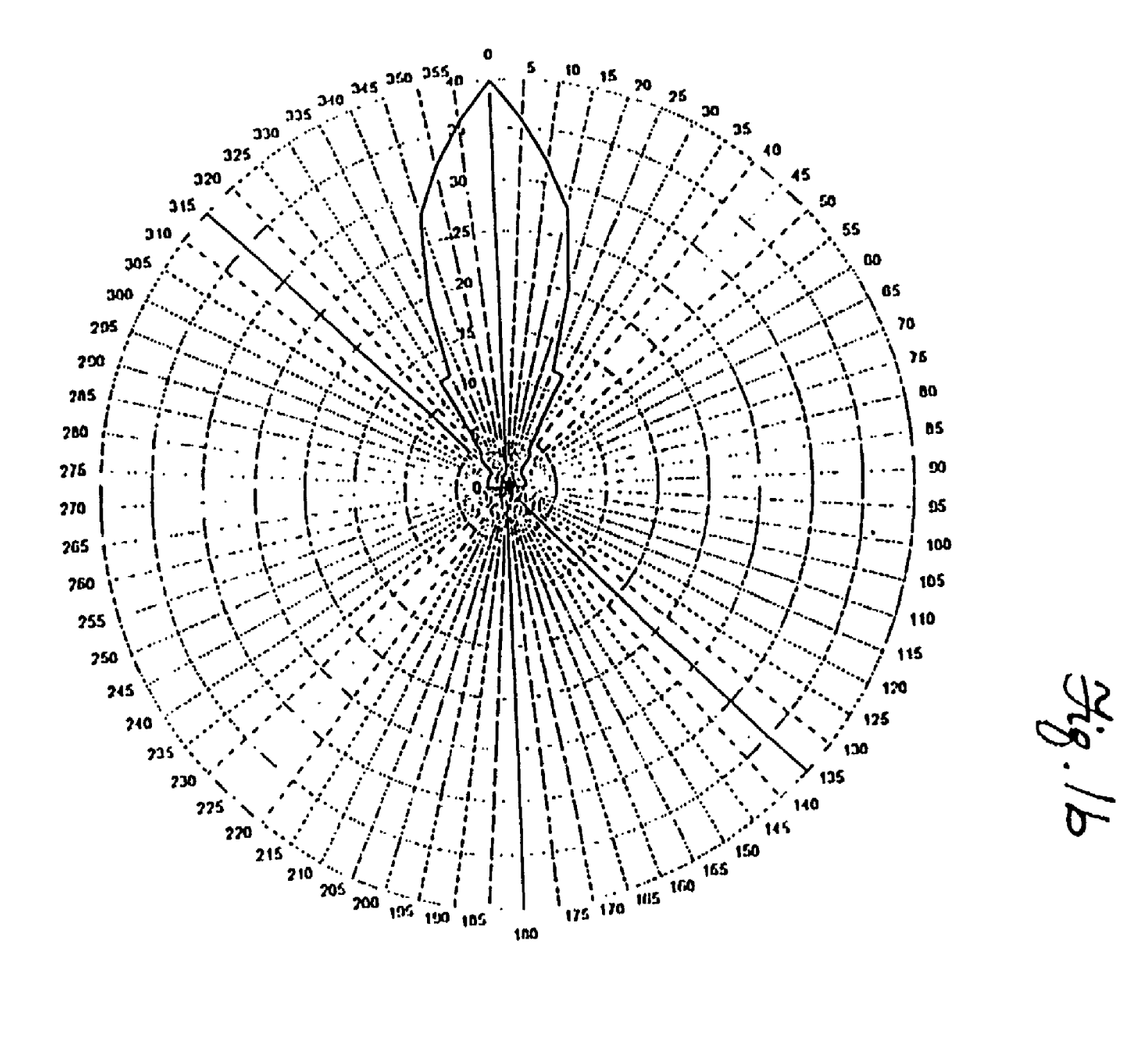
FIG. 1b corresponds to FIG. 1a, but for the vertical plane rather than the horizontal plane.
Figure 2:
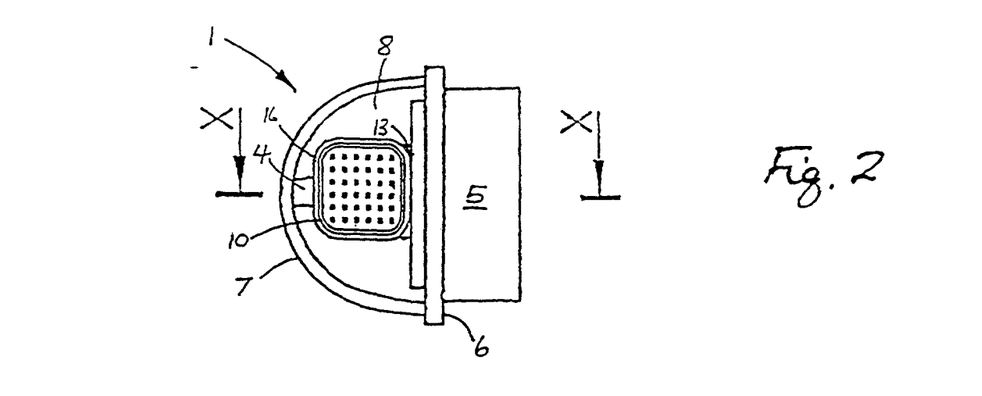
FIG. 2 is a front view of a navigation light assembly incorporating a lamp unit according to one aspect of the present invention.
Figure 3:
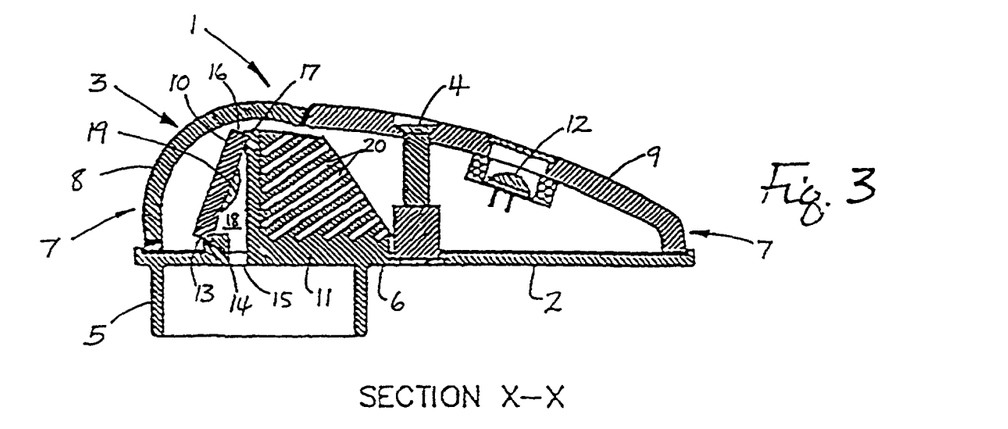
FIG. 3 shows the navigation light assembly of FIG. 2 from above and corresponds to a transverse sectional view along line X—X of FIG. 2.
Figure 4:
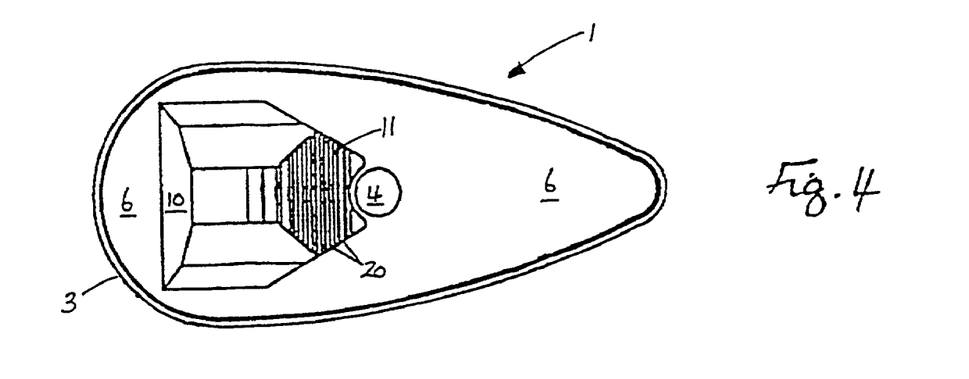
FIG. 4 is a view of the navigation light assembly of FIG. 2 from one side with window and housing removed.
Figure 5:
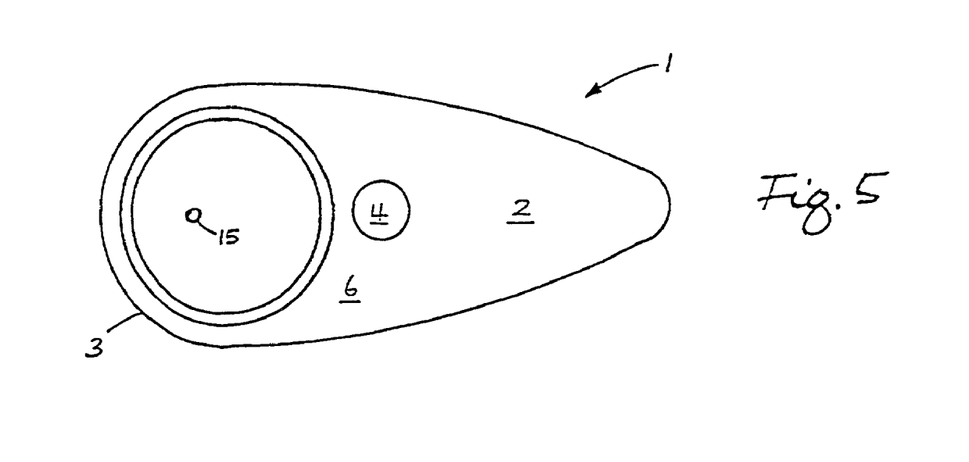
FIG. 5 is a view of the navigation light assembly from the opposite side to that of FIG. 4.

In fact, required angular distributions of the FAA of light for a starboard navigation light are shown in FIG. 1. FIG. 1a shows the required azimuthal distribution and FIG. 1b shows the required angular distribution, in the vertical plane. It will be appreciated that the corresponding azimuthal distribution for a port light is merely the mirror image of that shown for the starboard light. The minimum light intensity at various azimuthal angles is shown (0° corresponding to the direction in which the aircraft faces). The FAA requires a minimum light intensity of 40 candela between 0° and 10°, 30 candela between 10° and 20° and 5 candela between 20° and 110°.

A variety of light sources are used in external aircraft lights, traditionally filament lamps and xenon flash tubes have been employed, but increasingly arrays of light emitting diodes (LEDs) are being used due to their greater reliability, robustness, lifetime and their low cost.

It will be appreciated that all these light sources emit uncollimated light that diverges over wide angles. As discussed, this can create problems, particularly for warning lights, where there is a need to satisfy the light emission regulations imposed by the relevant governing aviation authorities. Accordingly, it has been common practice to provide reflectors, for example, in order to divert the emitted light in the desired manner. However, use of rear reflectors is not an option when the LEDs are surface mounted as is usually the case.

As mentioned, conventional LEDs generally emit light with a smooth angular variation over a wide angle, so that it would appear approximately circular if included in FIGS. 1a and 1b. In fact, LED lamps emit light to about 60° on either side azimuthally of the forward direction. Thus in order to cover the required azimuthal emission range over 0° to 110°, port and starboard navigation lights must be turned away from the forward direction of the aircraft. They are typically pointed away from the forward direction, for example at about 30–35°, and, consequently, the brightest light is not emitted in the forward direction of the aircraft as would be desired. Consequently, the light intensity is too weak to meet the FAA required intensity in the forward direction.

Accordingly, a replacement bulb for a typical navigation light that includes both visible LEDs and IR LEDs for covert operations, such as that shown in WO98/21917 A1 to LFD Limited, would produce a diverging illumination pattern.

Collimation of light emitted by LEDs in an external aircraft light is known from GB 2,307,977 A1 to Chapman and Bloxham. In the particular embodiment disclosed, the aircraft light is a landing light comprising a central halogen lamp for producing a visible beam of light surrounded by a ring of IR LEDs. The landing light can be switched between normal and covert modes. Some of the IR LEDs have discrete plano-convex lenses associated with them, these lenses being individually mounted on a plate for the purpose of collimating the light emitted from the diode underneath into a narrow beam, whilst others are allowed to emit IR light in the normal way through corresponding apertures in the plate to provide area illumination for pilots wearing night vision goggles (NVGs).

However, Chapman and Bloxham merely collimates the light as it propagates through the lenses, and offers no suggestion of or assistance with directing the emitted light into a desired angular distribution.

SUMMARY OF THE INVENTION

The Applicant has sought to address the aforementioned disadvantages associated with LED warning lights. Accordingly, it is an object of the invention to provide a warning light for an aircraft which emits light with an angular distribution peaked in the forward and/or horizontal direction.

From a first aspect, therefore, the invention resides in a warning light for an aircraft comprising an array of LEDs and an optical unit held in front of the LED array, the optical unit incorporating optical means for propagating fractions of the light emitted from the LEDs in selected directions in accordance with a predetermined angular distribution.

By means of the present invention, the divergent light emitted by the LEDs that is incident on the optical unit propagates through the optical means and emerges with varying intensity over a range of angles. In this way, it is possible to divert a significant proportion of the light, which for a navigation light would otherwise be emitted to the sides, in a forward direction and consequently permits the light far to exceed the minimum intensity required in front of the aircraft. This is in sharp contrast to the conventional naked LED array in which the minimum forward intensity is not met. For an anti-collision light, it is possible to divert a significant proportion of the light which would otherwise be emitted in a vertical direction and hence wasted, to a horizontal direction thus increasing the light intensity where it is required. In other words, the invention has made it possible to realize the full benefits of LEDs as a light source in aircraft warning lights.

Expressed in another way, the invention resides in a navigation warning light for an aircraft comprising an array of LEDs and an optical unit held in front of the LED array, the optical unit incorporating optical means which redirects at least some of the light which would otherwise be emitted from the LEDs in a substantially lateral direction relative to the orientation of the aircraft, and emits a fraction of that light in a substantially forward direction.

Alternatively, the invention resides in an anti-collision warning light for an aircraft comprising an array of LEDs and an optical unit held in front of the LED array, the optical unit incorporating optical means which redirects at least some of the light which would otherwise be emitted from the LEDs in a substantially vertical direction relative to the orientation of the aircraft, and emits a fraction of that light in a substantially horizontal direction.

In a preferred embodiment, substantially all of the light emitted from the LEDs positioned directly behind the optical unit is incident upon it. In this way, almost none of the light emitted by the LEDs is wasted and all of the light is available to be propagated as desired. The optical unit may incorporate refractive, diffractive or reflective optical means or any combination thereof in order to propagate the light selectively.

Conveniently, the optical unit comprises first optical means, preferably refractive optical means such as a plurality of lenses, to collect the incident light. Advantageously, each LED has an associated lens. For example, each LED may have an individual lens disposed immediately in front thereof, so that the optical unit includes an array of lenses to match the array of LEDs. Preferably, these lenses are convex lenses, typically circularly symmetric lenses where light control in both the horizontal and vertical planes is desired, and are provided on the surface of the optical unit facing the LED array.

Where light control is desired in one plane only, for example in anti-collision lights, it may be sufficient to provide an array of cylindrical convex lenses, for example with one such lens being provided per row or column of LEDs. Moreover, in order to achieve yet further efficiency in light collection, it is particularly preferred that the cylindrical lenses are aspherical. Accordingly, the cylindrical lenses will generally form a series of ridges in alignment with the LEDs.

The desired light redistribution may be achieved in other ways. For example, the first optical means may additionally include one or more total internal reflection (TIR) structures, preferably extending from the surface of the or each lens.

The optical unit may include second optical means in addition to the first optical means. Such second optical means will generally be provided in situations where the first optical means is not adapted to achieve or is not capable of achieving the desired angular distribution on its own. For example, each convex lens in the first optical means collects the divergent light emitted from its associated LED, which is effectively a point source producing spherical waves, and directs the light through the unit towards the second optical means provided on the opposite face of the optical unit.

The second optical means preferably also comprises refractive means, for example in the form of one or more prisms, triangular prisms being particularly preferred for navigation lights. In general, such prisms will be provided on the opposite surface of the optical unit relative to the array of lenses. The light emerging from the or each prism, and hence the optical unit, is refracted and the angle of refraction will depend upon the angle of incidence at the appropriate face of the prism. Accordingly, the shape and configuration of the lenses and prism(s) are coordinated to provide the required angular distribution of the emergent light.

A diode array in a starboard or port navigation light will usually be pointed at an angle away from the forward direction of the aircraft in order to provide the necessary illumination around to 110° in the horizontal plane as shown in FIG. 1a. This azimuthal angle must of course be at least 20°, but historically has been set at about 30–35° to provide the required intensity of illumination. Accordingly, in the present invention it may be appropriate to provide at least one prism which serves to direct at least some light to the peripheral higher angles of the required distribution.

In a particularly preferred embodiment, the convex lenses are uniform and produce plane waves (i.e. collimated light) which are subsequently incident on a plurality of prisms. However, the lenses may alternatively act to focus or defocus the emitted light towards the or each prism. As the light is typically propagated from each convex lens in a common direction, varying the angles of the prism faces in either the horizontal plane and/or the vertical plane results in a variation of the direction of propagation of light from the optical unit either horizontally and/or vertically. Hence, careful selection of the angles of the prism faces allows the required angular distribution to be emitted by the warning light.

For anti-collision lights, the face of the optical unit opposite the first optical means may simply be planar, in other words without any second optical means. On the other hand, when the first optical means includes TIR structures, it is simpler from a manufacturing point of view to include such structures in conjunction with discrete lenses, one per LED. However, it will be appreciated that the use of discrete lenses results not only in light control in the vertical plane, where control is required, but also in the horizontal plane, where control is not required. In order to compensate for this, the second optical means preferably comprises one or more lenses as opposed to prisms. Such lenses may typically be cylindrical or anamorphic. Pillow lenses having the appropriate horizontal and vertical curvature angles may be used to provide the required adjustment.

Advantageously, the or each optical means is formed as an integral part of the optical unit. For example, the optical unit may comprise a molded plastic element in which the first and second optical means, such as the lenses and prisms, are formed on the respective surfaces during the molding process.

The LEDs may be arranged in any desired configuration, for example in a square or rectangular array to form rows and columns. However, the LEDs may equally be arranged in a circle, either radially or concentrically.

Furthermore, the LEDs may comprise a plurality of groups of LEDs, the groups being connected in parallel and each group comprising a plurality of LEDs connected in series. This arrangement incorporates built-in redundancy which prevents catastrophic failure of the LED array because if one diode fails, the whole unit will not also fail. Rather, only the group or string of diodes which contains the defective LED will fail and the remaining strings will be unaffected. Each string of LEDs may form a row of the square array.

Of course, a square array of LEDs will desirably require a corresponding square array of lenses, which in turn desirably requires a corresponding arrangement of prisms. If a separate prism is to be provided for each lens, these too must be arranged in a corresponding square array. The Applicant has had the foresight to appreciate that a row or column of LEDs can be assigned to emit light in a particular desired propagation direction in either the horizontal or vertical plane. If no particular angular distribution is desired in the other plane, a prism of uniform cross-section can be positioned above the row or column of LEDs. On the other hand, if both horizontal and vertical redirection is required, a prism having a varying cross-section along its length can be positioned above the row or column. In such an arrangement, the prisms may form a series of ridges along a surface of the optical unit, for example creating a saw-tooth appearance when viewed in cross-section.

When the LEDs are arranged into a plurality of strings to form a square array, each string comprising a row of the array, the prisms advantageously extend along the columns of LEDs (i.e. orthogonal to the strings). This has the advantage that should a string of LEDs fail, light will be lost across a range of propagation directions merely reducing the intensity by a small amount in each direction. Conversely, if the prisms extended along the length of the strings in their rows, a string failing could result in a significant, or even total, loss of light in one of the propagation directions and therefore offers a less preferred arrangement.

The warning light according to the invention most conveniently comprises a single optical unit associated with a single LED array. This maximises the inherent benefit of making an array of lenses rather than individual lenses, viz. it is easier and less expensive to manufacture the optical unit and it is also easier and less expensive to assemble the warning light. Preferably, the optical or lens unit is made from molded plastic.

From another aspect, the invention resides in an optical unit for use with an LED array in an aircraft warning light, the unit comprising optical means for propagating fractions of the light emitted from the LEDs in selected directions in accordance with a predetermined angular distribution.

More particularly, the invention resides in an optical unit for use with an LED array in an aircraft navigation warning light, the unit comprising optical means which redirects at least some of the light which would otherwise be emitted from the LEDs in a substantially lateral direction relative to the orientation of the aircraft, and emits a fraction of that light in a substantially forward direction.

Alternatively, the invention resides in an optical unit for use with an LED array in an aircraft anti-collision warning light, the unit comprising optical means which redirects at least some of the light which would otherwise be emitted from the LEDs in a substantially vertical direction relative to the orientation of the aircraft, and emits a fraction of that light in a substantially horizontal direction.

More especially, this invention further resides in an optical unit for use with an LED array in an aircraft warning light, the unit comprising a transparent body having first and second opposed faces, the first face being provided with first optical means, such as a plurality of convex lenses, and the second face being provided with second optical means, such as at least one prism, the relative disposition of the first and second optical means being such as to propagate light from the unit in accordance with a predetermined angular distribution.

Preferably, the body is made of plastics, and formed with integral lenses, prisms, etc., such as by molding. In this way, the cost of manufacture for the unit can be minimized. Polycarbonate and acrylic materials are particularly suitable for providing the desired optical quality and strength, and do not readily distort when subject to heat generated by the LEDs.

Typically, the LEDs are surface mounted on a ceramic substrate and the optical unit is held in front of the LED array on its substrate. The optical unit may be in contact with the LED array, for example the LEDs may be encapsulated in a potting compound against which the optical unit abuts. Alternatively, the optical unit and the LED array, whether or not in a potting compound, may be separated. Any gap created between the optical unit and LED array is also advantageous as it allows a channel for air to circulate therebetween, allowing more of the heat produced by the LEDs to be dissipated through convection and so reducing the heating effect on the optical unit.

The separation of LEDs and the optical unit will be predetermined according to the design of the optical unit. In particular, this separation is ideally such that the maximum amount of emitted light from the LEDs is collected. The spacing between the LEDs and the optical unit, that is the distance between the LEDs and the apex of the lenses, may generally be up to 5 mm, more preferably between 0.5 mm to 2 mm. Indeed, a gap of about 1 mm is particularly suitable for a navigation light as it is sufficiently close to the LEDs to ensure optimum light collection. For anti-collision lights, the spacing may be even closer, about 0.3 mm gap being preferred.

The fixed separation of optical unit and LEDs can be maintained by a spacer. This spacer may either be separate or may be integral with either the optical unit, the LED array or the potting compound. For example, a rim may be provided around the perimeter of the optical unit such that it abuts against the perimeter of the ceramic substrate on which the LED array is mounted. Conversely, the rim may be integral with the ceramic substrate. Alternatively, the required depth of potting compound may be increased to form a spacer. In this way, correct assembly of the LED array and the optical unit is simplified because the required spacing is automatically achieved.

The LED array and the optical unit may be supplied together as a single component, complete with spacer, and hereinafter referred to as a lamp unit. Such a lamp unit may be fitted as a replacement for an existing LED array, or may be fitted as apart of an entire light assembly complete with housing.

Preferably, the warning light includes a separate cover to protect the optical unit from the elements. Obviously, the cover must comprise a transparent window and must not adversely affect light emission from the optical unit. However, forming the optical unit integrally with the cover, so that the prisms are on the outer surface of the cover, is undesirable.

As will be appreciated, an aircraft moves at considerable speed relative to its surroundings. Frequent high-speed impacts will occur with debris, e.g. rubber left on runways or ice in the atmosphere. Such impacts inevitably cause damage to a light's protective cover, resulting in chipping or cracking of the window. If the outer surface of the window bears prisms or otherwise acts as a lens, the chipping or cracking would be to the detriment of the optical performance of the warning light. Moreover, the inevitable accumulation of dirt between the prisms would also be detrimental. Accordingly, it is advantageous for the windows to be relatively inexpensive as they must be replaced periodically.

When the lamp units are for anti-collision lights, it will be appreciated that a series of such units will be so positioned that they face out in a radial arrangement to provide the required horizontal illumination. A hexagonal arrangement of lamp units provides a convenient means of achieving the desired light distribution, although other arrangements may be equally suitable. Of course, and as already discussed, the optical unit will generally be adapted to provide a different angular distribution of light than is appropriate for a navigation light.

Also, in order to provide a covert capability, one or more IR LEDs may be included in the LED array which forms part of the warning light of the invention. Alternatively, IR LEDs or other IR light sources may be provided separately from the lamp unit.

BRIEF DESCRIPTION OF THE DRAWINGS

In order that the invention can be more readily understood, reference will now be made, by way of example only, to the accompanying drawings in which.

DETAILED DESCRIPTION OF THE PREFERRED EMBODIMENTS

FIGS. 2 to 5 show a wing navigation light assembly 1 for an aircraft according to the present invention. The navigation light assembly 1 can either be used as a replacement for existing lights on an aircraft or for fitting to new aircraft.

To fit the navigation light assembly 1 to an airplane wing, the assembly is placed with its flat surface 2 against a surface of the wing with its wider end 3 facing the direction of travel. In the illustrated embodiment, the navigation light assembly 1 is attached to the end of a wing by a fastener 4 with its flat surface 2 disposed vertically against an end surface of the wing, and so terms like top and bottom should be construed accordingly.

The navigation light assembly 1 has an external shape corresponding to a bisected teardrop which is advantageous in terms of aerodynamics. A hollow cylinder 5 extends from a metal mounting plate 6 near the front half of the light assembly 1. When fitted to an aircraft, the hollow cylinder 5 fits into an aperture in the wing and provides a duct for routing electrical cables.

The external portion 7 of the navigation light assembly 1 is comprised of a transparent plastic or glass window 8 and a metal housing 9, both of which attach to the metal mounting plate 6. The window 8 is disposed at the front of the navigation light assembly 1 and the opaque housing 9 is disposed at the rear.

A lamp unit 10, a radiator 11 and a covert light 12 are housed within the external portion 7. The rectangular slab-like lamp unit 10 is forward-facing and is disposed towards the front of the assembly 1 behind the transparent plastic window 8 so that the lamp unit 10 is clearly visible through the window 8. The window 8 merely protects the lamp unit 10 and does not significantly alter the emitted light distribution. A first side 13 of the lamp unit 10 is mounted to an angled face 14 of the mounting plate 6 directly in front of an aperture 15, and a second side 16 of the lamp unit 10 is mounted to a top corner 17 of the radiator 11 above and behind the aperture 15. The lamp unit 10 is, therefore, tilted at an angle away from the forward direction of the aircraft so that it points forwards and to the side at an azimuthal angle of approximately 35°.

The tilt of the lamp unit 10 creates a cavity 18 between the lamp unit 10 and the radiator 11 in communication with the aperture 15 so that cables can be passed directly through the aperture 15 into the cavity 18 for attachment to a connector 19 provided on the back of the lamp unit 10.

Contact between the lamp unit 10 and the mounting plate 6 and, in particular, the radiator 11 is optimised to allow good thermal conduction of the heat generated by the lamp unit 10 away from the lamp unit 10. The radiator 11 is provided with a plurality of deep grooves 20 to increase the surface area available for heat dissipation.

A lamp unit 10 comprises an array of LEDs 27 preferably embedded in a potting compound 46 and arranged in a plurality of strings 28, each LED connected in series to other LEDs in the same string 28 and with the strings connected in parallel (see FIGS. 2 and 3) The lamp unit 10 also includes an optical unit 22 spaced from the LEDs. Each of the LEDs 27 is associated with a convex lens 30 on the inner surface of the optical unit 22, and the outer surface of the optical unit 22 comprises a series of straight-edged prisms 32 running orthogonally to the LED strings 28.

A covert light module 12 including LEDs which emit IR radiation rather than visible light may be located away from the lamp unit 10 in a hole provided in a rear portion of the housing 9. Accordingly, IR light will be transmitted in a generally upward and rearward direction for the benefit of 'friendly' pilots wearing NVGs.

Figure 6:
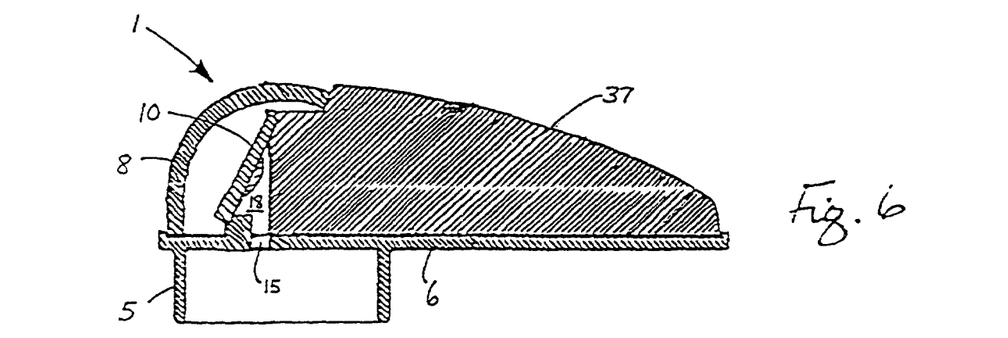
FIG. 6 is a sectional view of an alternative navigation light assembly according to the present invention.

Variations in the design of the navigation light are also possible. For instance, FIG. 6 shows an alternative navigation light assembly 1 intended for use with aircraft which fly at sub-sonic speeds. This differs most markedly from the above described embodiment in that the rear of the external portion is defined by a large solid metal heat-sink 37, rather than the thin-walled metal housing 9. In this embodiment, the lamp unit 10 is mounted directly to the front of the heat-sink 37, so that good thermal contact is established. This heat sink 37 is in direct contact with the atmosphere and consequently can transfer heat rapidly to its surroundings.

Figure 7:
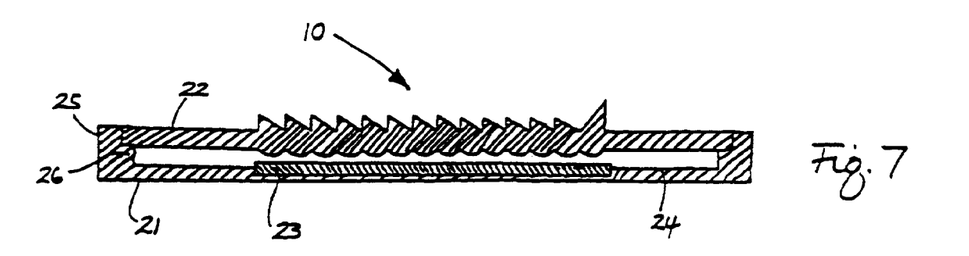
FIG. 7 is a transverse sectional view of a lamp unit according to another aspect of the present invention.

FIG. 7 is a sectional view showing in detail a lamp unit 10 according to the invention. The lamp unit 10 comprises a metal container 21, a plastic optical unit 22, and an LED array on a ceramic substrate (shown together as 23). The LED array on its ceramic substrate 23 is mounted on the back wall 24 of the container 21, the container 21 having a rim 25 which forms the four sides walls of the lamp unit 10. The rim 25 is stepped to form an integral spacer 26 that separates the optical unit 22 from the LED array 23 with a desired gap of about 1 mm.

Figure 8:
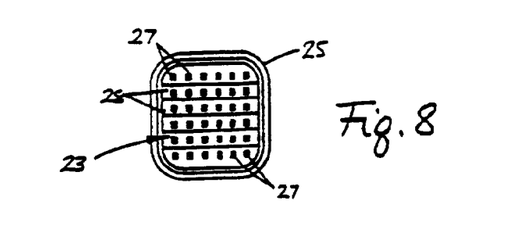
FIG. 8 is a front view of a typical LED array for use in aircraft warning lights

FIG. 8 shows a typical square LED array 23 for use with an optical unit according to the invention. The array 23 comprises thirty-six LEDs 27 mounted in six horizontal strings 28 of six LEDs 27 on a substantially square ceramic substrate. The strings 28 of LEDs 27 are connected to the power supply in parallel to ensure that should one LED 27 fail, only the other LEDs 27 in its string 28 will also be extinguished. Of course, it will be appreciated that the number of LEDs 27 in the illustrated LED array 23 can be varied, as can the configuration and arrangement of the strings 28.

Figure 9:
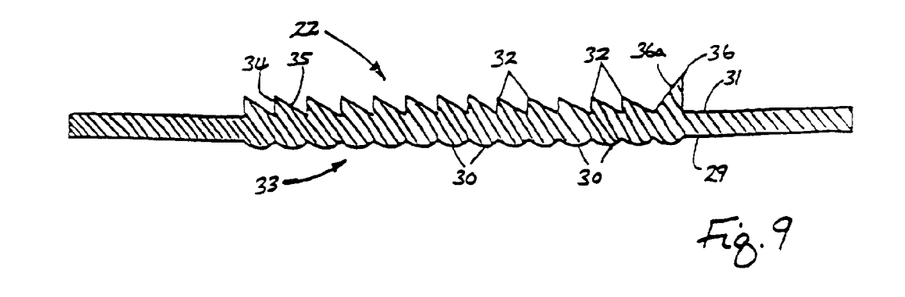
FIG. 9 is a transverse sectional view of an optical unit according to yet further aspect of the present invention.

FIG. 9 shows the optical unit 22 forming part of lamp unit 10 in FIG. 6. The optical unit is molded from plastic and has an inner surface 29 which in use bears a number of uniform convex lenses 30, whilst its outer surface 31 in use bears a number of straight-edged prisms 32. This optical unit is for use in a navigation light. The convex lenses 30 are arranged such that the light emitted by each LED 27 is collected by a lens 30: therefore, there is a common number of LEDs 27 and lenses 30. Accordingly, the convex lens array 33 is arranged to coincide with the LED array 23 when fitted in the lamp unit 10. It will be appreciated that the lens array 33 shown in FIG. 8 is not intended for use with the LED array 23 of FIG. 7, but is designed for use with an LED array 23 with fourteen LEDs 27 per string 28.

The prisms 32 are triangular in cross-section and project outwardly from the outer surface 31 of the optical unit 22 with an upright face 34 and a sloped face 35. This triangular shape of a prism 32 varies along a column of LEDs 27, so that each prism 32 is molded as a ridge 32 in the outer surface 31 of the optical unit 22. Each ridge 32 extends vertically across the length of the LED array 23 immediately above a column of LEDs 27. Essentially, each convex lens 30 directs substantially all light emitted from its associated LED 27 towards an associated section of prism 32 positioned immediately above.

In addition to the shape of each prism 32 varying along the prism's length, the shapes of individual prisms 32 (i.e. the ridges 32) vary across the optical unit 22. FIG. 9 shows that each prism 32 has an upright face 34, but the angle of the sloped face 35 varies across the array of prisms 32, such that the height of adjacent prisms 32 reduces gradually.

This graduation in the angles of the sloped faces 35 between adjacent prisms 32 allows an emitted light pattern in the horizontal plane to be produced that better approximates those specified by the governing aviation authorities. For example, the majority of the prisms 32 can be used to refract light away from the 35° direction towards the forward direction of the aircraft, more specifically between the angles of 0° and 20° where the greatest intensity is required. A minority of the prisms 32 can direct light to the higher angles of 20° to 110° to meet the required 5 candela in those directions.

An end prism 36 is provided with a sloped face 36a angled in the opposite sense to the others: this end prism 36 is used primarily to refract light to the higher azimuthal angles of the required angular distribution.

Similarly, varying the slope in an orthogonal direction along the length of each prism 32 allows an angular distribution in the vertical plane to be formed meeting the required distribution.

Figure 10A:
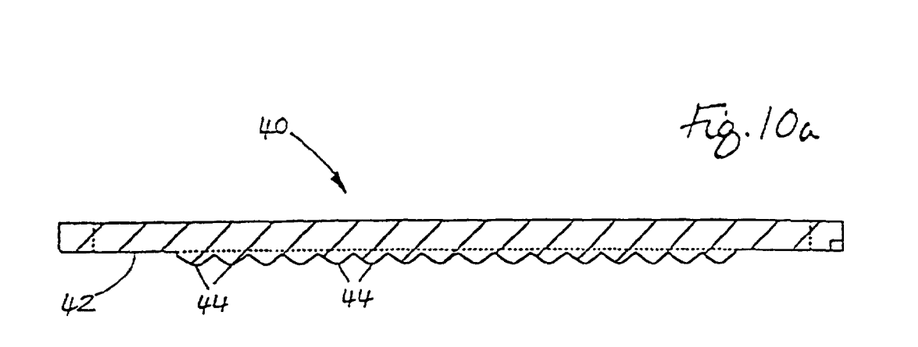
FIGS. 10a and 10b are transverse sectional and plan views respectively of an optical unit in accordance with yet another aspect of the invention.
Figure 10B:
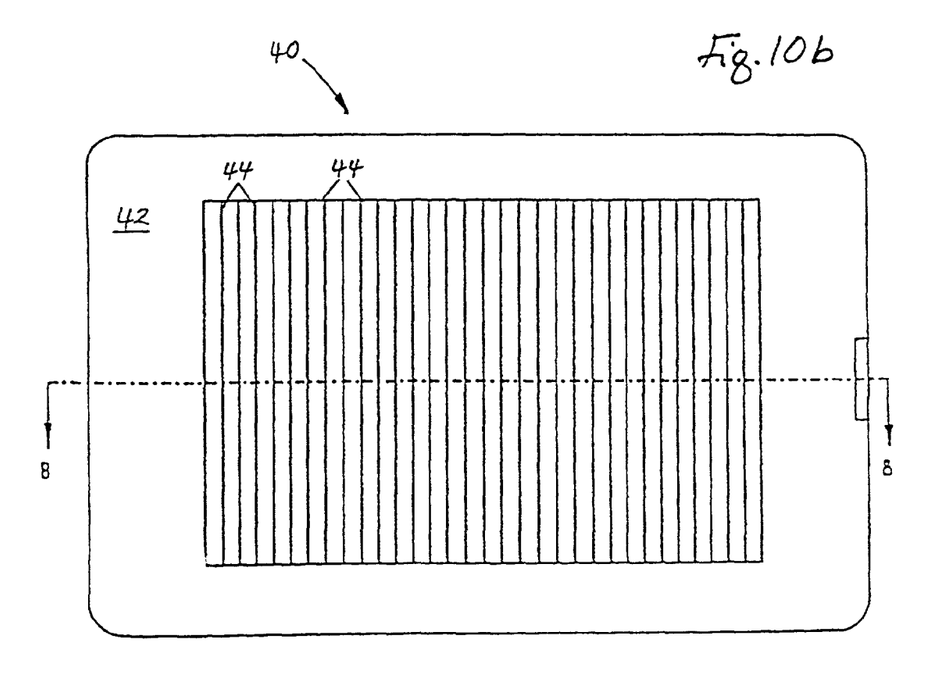

The optical unit described above deals with the angular distribution of light intensity in both the horizontal and vertical planes. However, optical units for modifying the angular distribution of light intensity in only one of the planes also form part of the present invention. To this end, FIGS. 10a and 10b illustrate an optical unit 40 for modifying the angular distribution in a single plane and as such is intended for use in an anti-collision light assembly. A series of such units is mounted in a substantially circular arrangement in front of corresponding LED arrays to redirect a proportion of light which would otherwise be emitted above and below the horizontal plane.

The optical unit 40 is provided on one face 42 with a series of aspherical cylindrical lenses 44 which together create a ridged appearance. This face 42 will in use be mounted opposite an LED array (not shown) so that the rows or columns of the LED array are aligned with the lenses 44. The LED array and the optical unit 40 will generally be mounted in upright positions facing outwards in the anti-collision light assembly. Moreover, to create control in the vertical direction, the optical unit 40 is orientated in use such that the ridges of cylindrical lenses 44 run horizontally.

It is to be appreciated that the above embodiments are merely illustrative and that variations and modifications which do not depart from the scope of the invention will be apparent to those skilled in the art.

For instance, it will be noted that the optical units 22 and 40 illustrated above all use refraction to manipulate the direction of the light emitted from the LEDs 27. However, in addition to the use of refractive optics, the use of diffractive and/or total internal reflection-based optics can offer an equally effective means for carrying out the invention. For example, a diffraction grating could be employed in the optical unit 22 rather than the prisms 32 described herein above. In addition, a combination of refractive and diffractive optics could be used, such as a lens array 33 to collect light and a grating to direct the angular emission of the light from the optical unit 22.

Accordingly, reference should be made to the appended claims and other general statements herein rather than to the foregoing specific description as indicating the scope of the invention.

What is claimed is:

1. An external in flight aircraft warning light assembly comprising:

a housing adapted to be mounted on the exterior of the aircraft;

a transparent window protecting an opening in the housing;

a light source comprising an array of LEDs disposed in the housing; and an optical unit also disposed in the housing behind the window and fixed in front of the array of LEDs, the optical unit comprising a transparent, molded body having first and second opposing faces, the first and second opposing faces each including at least one of refractive optics, diffractive optics and reflective optics, the optical unit being adapted to collect the light emitted from the LEDs and propagate fractions of the collected light to provide a warning signal in accordance with a predetermined non-uniform angular distribution that varies in intensity over a range of angles based on the at least one of the refractive optics, the diffractive optics and the reflective optics;

wherein the first opposing face of the transparent molded body includes a plurality of lenses adapted to collect light from the LEDs incident upon the optical unit;

wherein the second opposing face is adapted to transmit the collected light from the optical unit, and the second opposing face comprises a plurality of prisms adapted to propagate the collected light in accordance with the predetermined angular distribution and extending along one or both of the length and width of the LED array to form a series of ridges on an outer surface of the optical unit; and wherein the array of LEDs comprises a plurality of strings of LEDs, each string being connected in parallel with the other strings of said plurality of strings and comprising a plurality of LEDs connected in series, and the prisms are positioned to extend across the LEDs of a plurality of the strings.

2. An assembly as in claim 1, wherein the LED strings are arranged in rows, and the prisms lie in a plane parallel to the array and extend orthogonally with respect to the rows.

* * * * *